United States Patent [19]

Bernard et al.

[11] Patent Number: 4,615,088
[45] Date of Patent: Oct. 7, 1986

[54] METALIZED FILM FOR CONSTRUCTING CAPACITORS AND A PROCESS FOR MANUFACTURING SAID CAPACITORS

[75] Inventors: Daniel Bernard, Seurre; Jean C. Dubois, Magny Les Hamaux, both of France

[73] Assignee: LCC-CICE Compagnie Europeenne De Composants Electroniques, Bagnolet, France

[21] Appl. No.: 624,030

[22] Filed: Jun. 25, 1984

[30] Foreign Application Priority Data

Jun. 28, 1983 [FR] France .................. 83 10681

[51] Int. Cl.⁴ .......................................... H01G 7/00
[52] U.S. Cl. .............................. 29/25.42; 156/184; 156/192; 156/259; 427/80; 361/323
[58] Field of Search ............. 29/25.42; 156/184, 259, 156/191, 260, 192, 271; 361/323; 427/79, 80

[56] References Cited

U.S. PATENT DOCUMENTS

| | | | |
|---|---|---|---|
| 3,276,932 | 10/1966 | Gaenge | 156/191 |
| 3,854,182 | 12/1974 | Forster | 29/25.42 |
| 3,988,824 | 11/1976 | Bodway | 427/80 |
| 4,226,011 | 10/1980 | Hunt | 427/79 |
| 4,378,620 | 4/1983 | Lavene | 361/323 |
| 4,453,199 | 6/1984 | Ritchie et al. | 29/25.42 |

FOREIGN PATENT DOCUMENTS 841475 7/1960 United Kingdom .................. 427/79

*Primary Examiner*—Mark Rosenbaum
*Assistant Examiner*—P. W. Echols
*Attorney, Agent, or Firm*—Oblon, Fisher, Spivak, McClelland & Maier

[57] ABSTRACT

A metalized film for constructing capacitors formed from a flexible dielectric support medium comprising on at least one of its faces metalized parallel strips partially covered by lacquer strips parallel to the preceding ones, two successive metalized strips being partially covered by a lacquer strip whereas two successive lacquer strips partially cover the same metalized strip.

7 Claims, 4 Drawing Figures

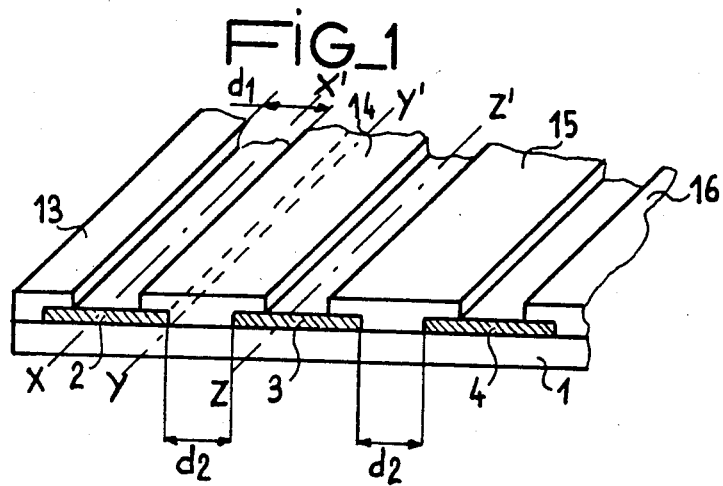
FIG_1
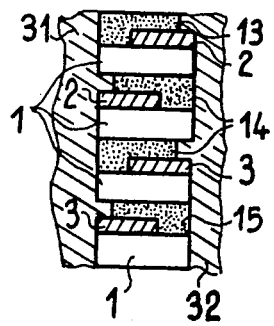
FIG_2
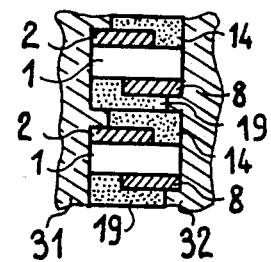
FIG_4
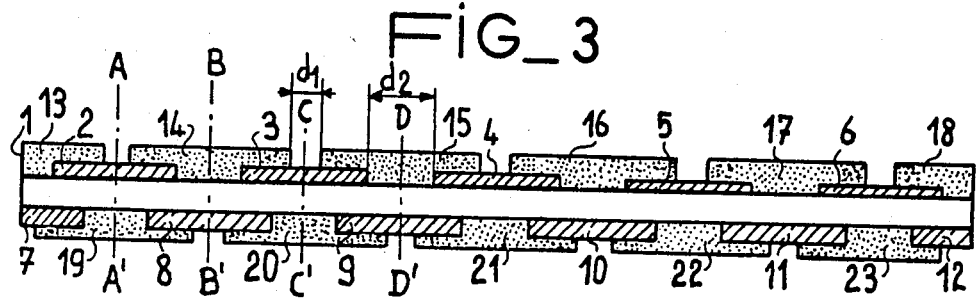
FIG_3

METALIZED FILM FOR CONSTRUCTING CAPACITORS AND A PROCESS FOR MANUFACTURING SAID CAPACITORS

BACKGROUND OF THE INVENTION

1. Field of the Invention

The present invention relates to a metalized film for constructing capacitors as well as a process for constructing capacitors from said film.

2. Description of the Prior Art

Metalized dielectric flexible film based capacitors are generally formed by winding individual capacitors or by stacking said metalized films so as to form a master capacitor then in cutting said master capacitors up into individual capacitors. Different known techniques for constructing these capacitors are described for example in French Pat. Nos. 879 280, 1 051 464, 1 051 465, 903 040 and 2 011 553. The metalized plastic material film is generally wound or stacked by superimposing two metalized dielectric films one having an unmetalized margin at one of its edges and the other an unmetalized margin at the other edge. Thus, the lateral sides of said capacitors may then be joined by a schoop process to one of the edges of the sides of the metalized layers or electrodes of even rank and to the other side of the metalized layers or electrodes of uneven rank.

Although this technique is advantageous, a certain number of disadvantages are noted related to the presence of air between the layers thus stacked. In the case of wound capacitors, the air layers present in the capacitor modify the capacity thereof in a way which is difficult to control and requires the winding space to be reduced so as to obtain a precise capacity value. In the case of capacitors of the stacked type obtained by cutting up from a master capacitor, an absence of homogeneity of said master capacitors may be noted, those situated under the stack being more compact than those situated at the top of the stack, which also causes a variation in capacity per volume element.

SUMMARY OF THE INVENTION

With the metalized film of the invention, the disadvantages encountered in constructing capacitors may be reduced. For this, it is formed from a flexible support comprising parallel metalized strips partially covered with a strip of lacquer, whereas two successive strips of lacquer partially cover the same metalized strip. Preferably, the strips of lacquer will be disposed symmetrically with respect to the median plane of the metalized strips.

The presence of lacquer in fact causes, during the heat treatment which follows the construction of the capacitor, the layer of lacquer to adhere to the immediately upper dielectric layer which improves the elimination of the air present in said capacitors.

Preferably, the metalized film of the invention will comprise layers covered with layers of lacquer on both faces of the flexible dielectric film. The metalized strips on one of the faces of the film will be offset laterally with respect to those of the other face of the film and will be preferably disposed symmetrically with respect to the median plane perpendicular to each metalized strip of the other face of the film. The preferred construction of the film of the invention is obtained when the strips of lacquer on one of the faces of the film are disposed symmetrically with respect to the median plane perpendicular to each strip of lacquer on the other face of the film whereas the median plane of a layer of lacquer on one of the faces of the film is the same as that of the metalized layer disposed on the other face.

In this latter case, a lacquered metalized film is obtained on both faces which may be directly used by stacking on itself. This stacking may be effected in different known ways such as mentioned in the above French patents. Depending on the type of stacking chosen, cutting up into individual capacitors along the above mentioned median planes may take place before or after stacking.

The dielectric lacquer used may be any polymer able to be placed in solution in a solvent or in the form of an aqueous emulsion, having good dielectric properties for forming the capacitors. There may be mentioned by way of example the solutions of polymers such as polycarbonate, polysulfone, polystyrene or its co polymers and generally polyolefins. All these polymers have temperature stable dielectric characteristics. The thickness of lacquer deposited must be at least of the order of 0.7 microns so as to avoid the absence of lacquer in places. A thickness of the order of a micron gives good results. Well known coating processes will be used for depositing this lacquer on the dielectric film support median. In some cases, so as to improve the attachment of the lacquer to the dielectric support median, this latter may for example undergo an "anchoring" treatment.

Coating of the lacquer layer must however take place under special conditions. It has in fact been discovered that the residual solvents in the layer of lacquer had a considerable influence on the insulation resistance of the capacitors manufactured from these films: it is in fact necessary to have traces of solvents in the layer of lacquer so as to ensure bonding of said layers to each other. However, it has been unexpectedly discovered that an excess of residual solvents in this layer results in insulation resistances which are too low. After difficult research work, the applicant thinks that with a proportion of residual solvent between 10 and 500 ppm with respect to the weight of the dielectric contained in the lacquer, a capacitor may be obtained in which the air, after heat treatment, has been practically totally eliminated, whatever the position of the capacitor on the winding wheel, and whose insulation resistance measured at a 100 volts DC is greater than or equal to 50 Giga Ohms per microfarad, after regeneration under a DC voltage of the order of 100 volts/$\mu$ of dielectric thickness. The best results, not only from the point of view of bonding of the layers, so elimination of the air, but also from the insulation resistance point of view, are obtained with a proportion of the order of 100 ppm. Furthermore, a more homogeneous layer of lacquer is obtained when about 1% by weight of tensio-active agents are incorporated in the lacquer before coating it on the substrate dielectric film.

The invention also relates to a process for manufacturing capacitors from a film coated with a metal layer of metalized strips and lacquer strips on only one of these faces such as defined above, in which process said film is cut along the median planes perpendicular to the metalized strips as well as along the median planes perpendicular to the lacquer strips so as to obtain a plurality of elementary films formed by a film portion partially coated with a metalized strip only extending as far as one of the edges of the film portion, this latter being partially covered with a strip of lacquer only extending as far as the other edge of the film portion, wherein a stack is formed from two successive elementary films cut from the film and then the metalized strips of even rank and those of uneven rank are joined respectively electrically together by projecting metal on the corresponding lateral faces of the stack.

In a variant in which the metalized and lacquered film is used on the two faces such as defined above, said process of the invention consists in cutting this film along the median planes perpendicular to the metalized strips as well as along the median planes perpendicular to the lacquer strips, then in superimposing these films so as to form a stack of said films having alternatively a metalized layer flush with one of the lateral faces of the stack and a metalized layer flush with the other lateral face of said stack, then in schooping the stack thus formed.

In both cases, the process of the invention also comprises a heat treatment step for further causing the layers of lacquer to adhere to the film layers, said step being situated after the step for schooping the stack. This heat treatment is necessary, on one hand, in order to eliminate the air between two following layers and, on the other hand, in order to ensure a bonding of said lacquer layers to each other.

When this stack leads to the formation of a master capacitor, this latter is then cut up into elementary capacitors perpendicularly to the lateral schooping.

BRIEF DESCRIPTION OF THE DRAWINGS

The invention will be better understood from the following description of embodiments, given by way of non limiting examples, with reference to the accompanying FIGURES which show:

FIG. 1, a perspective view of a film metalized on only one face in accordance with the invention, FIG. 2, a sectional view of a capacitor formed from a film of FIG. 1, FIG. 3, a sectional view of a metalized film in accordance with the invention comprising metalized strips and lacquer strips on both its faces, and FIG. 4, a sectional view of a capacitor formed from a film of FIG. 3.

DESCRIPTION OF THE PREFERRED EMBODIMENTS

In FIG. 1 is shown a perspective view of a film metalized and lacquered on only one face in accordance with the invention. On a flexible dielectric supporting film 1 such for example as a polyester, polycarbonate, polystyrene film etc . . . , are deposited metalized strips 2, 3 and 4 extending parallel to each other and spaced apart respectively by a value $d_2$. This deposition of metalized strips is effected in a way known per se by metalization for example in a vacuum apparatus, the strips without metalization being obtained by masking (mask, oil, etc . . . ,). Then dielectric lacquer layers 13, 14, 15 and 16 are deposited on the metalized film thus obtained by any appropriate means (coating, photogravure, etc . . . ). This lacquer must have on the one hand good dielectric properties (but this is not its essential quality when the film is lacquered on only one face as will be seen further on) and have also the property of adhering to the supporting film 1. This adherence may by either of the fusion type, or of the pressure type. The lacquer strips thus deposited are disposed parallel to the metalized strips, offset with respect to them and spaced apart respectively by $d_1$. Preferably, the strips of lacquer such as 13 and 14 will be disposed symmetrically with respect to the median plane of the metalized strip 2 and conversely the metalized strips 2 and 3 will be disposed symmetrically with respect to the median plane of the strip of lacquer 14.

In FIG. 2 is shown a capacitor obtained from a film such as described in FIG. 1. The film of FIG. 1 is cut along the median planes XX' of the metalized strip 2, YY' of the lacquer strip 14, ZZ' of the metalized strip 3, etc . . . . Two adjacent films are then superimposed so as to obtain, as shown in FIG. 2, successively a portion of the dielectric film 1, a metalized strip portion 2, offset to the left, a portion of the lacquer layer 14 offset to the right, a portion of the dielectric film 1, a portion of the metalized strip 2 offset to the right, a portion of the lacquer strip 13 offset to the left, etc . . . . The lateral schooping 31 and 32 obtained by projecting metal on the sides of the stack thus connect together the plates having the same parity, 31 connecting together the plates offset to the left, whereas 32 connects together the plates offset to the right.

In FIG. 3 is shown a preferred variant of the film of the invention. In this FIG., the same elements as those in the preceding FIGURES bear the same references. Besides the metalized layers and the layers of lacquer disposed on the upper face of the dielectric film 1 (see FIG. 1), this latter comprises on its lower part a plurality of metalized strips 7, 8, 9, 10, 11, 12 separated from each other by the same distance $d_2$, which metalized strips are themselves partially covered by strips of lacquer 19, 20, 21, 22 and 23. The distribution of the metalized layers and of the lacquer layers is the same as on the other face. However, the metalized layers of the lower face of film 1 are offset with respect to those of the upper face as well as the strips of lacquer, so that the median planes AA', CC', etc . . . of the metalized strips 2, 3, etc . . . situated on the upper face of the film are also the median planes of the layers of lacquer 19, 20 etc . . . situated on the lower face of the film. Conversely, the median planes BB', DD', etc . . . of the layers of lacquer 14, 15 etc . . . situated on the upper face of the film 1 are the same as those of the metalized layers 8 and 9 situated on the lower face of film 1. Thus, after the film has been cut along the median planes AA', BB', CC', DD', etc . . . shown in FIG. 3, a capacitor such as shown in FIG. 4 is obtained by simply stacking these films on each other. Such a capacitor is then particularly simple to form, since, by superimposing the film on itself, a capacitor is obtained directly in coiled and/or stacked form which may be schooped so as to join together the plates of the same parity then possibly cut up into elementary capacitors from a master capacitor.

Thus the problem is solved of locating the unmetalized margins (or the relative offset) which arises during manufacture by winding two metalized plastic material films.

What is claimed is:

1. A process for manufacturing capacitors, in which a lacquered metalized film is first of all formed by depositing on at least one of the faces of a dielectric film a plurality of parallel metalized strips which are then partially covered by strips of lacquer deposited parallel to the metalized strips but laterally offset with respect to the metalized strips so as to create non-lacquered strips on the metalized strips and non-metalized strips under the lacquer strips, the lacquering step consisting in coating with a solution of a dielectric inner solvent, followed by a drying step, in which the temperature and duration parameters are determined, depending on the lacquer used, so that the said lacquer layer comprises, at the end of this drying step a proportion of a residual solvents between 10 and 500 ppm with respect to the weight of the dielectric, said lacquered metalized film being then cut up into individual films comprising on at least one of the faces of the dielectric film a metalized layer comprising a non-metalized margin on its first edge, coated with a lacquer layer comprising a non-lacquered margin on its second edge, the metalized layers disposed on the two faces of the dielectric film comprising a margin placed on the first edge for one and on the second edge for the other and vice versa for the margins of the lacquer layers, each individual film then being wound, the capacitor thus formed being then subjected to a heat treatment so as to eliminate the air imprisoned in the capacitor during winding, on the one hand, and so as to bond the lacquer layers to each other or to the dielectric film, on the other, so as to obtain individual capacitors whose insulation resistance, measured at 100 DC volts, after a regeneration step at a DC voltage of the order of 100 volt/micron of thickness of dielectric, is greater than or equal to 50 Giga Ohms per microfarad.

2. The process as claimed in claim 1, wherein the proportion of residual solvant after the drying step is of the order of 100 ppm.

3. The process as claimed in claim 1, wherein the capacitors are formed by winding each individual film on a large diameter wheel to form a wound strip which is then separated into individual capacitors, wherein only a single film is used metalized and lacquered on the front and back sides, the metalized layers disposed on the two faces of the dielectric film comprising a margin placed at the first edge for one and at the second edge for the other and vice versa for the margins of the lacquer layers.

4. The process of claim 1, wherein each individual film is wound alone.

5. The process of claim 1, wherein each individual film is wound in conjunction with at least one other individual film.

6. The process of claim 1, wherein the capacitor formed after winding is then subjected to a heat treatment before schooping of the lateral edges of the capacitor.

7. The process of claim 1, wherein the capacitor formed after winding is then subjected to a heat treatment after schooping of the lateral edges of the capacitor.

* * * * *